United States Patent
De Wilde et al.

(10) Patent No.: US 6,270,705 B1
(45) Date of Patent: Aug. 7, 2001

(54) METHOD AND SYSTEM FOR INERTING POLYMERIC FILM PRODUCING MACHINES

(75) Inventors: Robert Marcel De Wilde, Sint Niklaas (BE); Pascal Yves Duro, Grandchamp (FR)

(73) Assignee: Praxair Technology, Inc., Danbury, CT (US)

(*) Notice: Subject to any disclaimer, the term of this patent is extended or adjusted under 35 U.S.C. 154(b) by 0 days.

(21) Appl. No.: 09/250,266

(22) Filed: Feb. 16, 1999

(51) Int. Cl.$^7$ .................................................. B29C 47/78
(52) U.S. Cl. ...................... 264/85; 264/555; 264/177.17; 425/378.1
(58) Field of Search .............................. 264/85, 514, 555, 264/556, 563, 565, 177.17; 425/133.5, 113, 376.1, 377, 378.1

(56) References Cited

U.S. PATENT DOCUMENTS

| | | | |
|---|---|---|---|
| 2,252,689 | 8/1941 | Bradshaw | 18/8 |
| 3,077,428 * | 2/1963 | Heuser et al. | |
| 3,578,527 | 5/1971 | Sakata et al. | 146/244 |
| 3,671,653 * | 6/1972 | Berry, Jr. | 264/85 |
| 3,847,522 | 11/1974 | Heckrotte et al. | 425/72 |
| 3,936,950 * | 2/1976 | Troue | 34/4 |
| 4,370,187 * | 1/1983 | Katagiri et al. | 156/244.23 |
| 4,554,120 * | 11/1985 | Ramamurthy | 264/85 |
| 4,823,680 | 4/1989 | Nowotarski | 98/36 |
| 4,917,844 * | 4/1990 | Komai et al. | 264/85 |
| 5,204,032 * | 4/1993 | Ramamurthy et al. | 264/85 |
| 5,378,263 * | 1/1995 | Prasad | 95/54 |
| 5,391,071 | 2/1995 | Hazarie et al. | 425/135 |

OTHER PUBLICATIONS

Gander et al., "Review of Die Lip Buildup in Plastics Extrusion", Polymer Engineering and Science, Jul. 1997, vol. 37, No. 7, 118–1126.

Van den Bossche et al., "Die Build–up during Polyolefin Processing: A Matter of Polymer design and Fluoropolymer–based Processing Additives", Exxon Corporation, May 1997.

* cited by examiner

Primary Examiner—Jan H. Silbaugh
Assistant Examiner—Mark Eashoo
(74) Attorney, Agent, or Firm—Bernard Lau

(57) ABSTRACT

This invention is directed to a method and system for using laminar barrier inerting techniques to shroud a selected area in an open space covering the polymeric film outlet and/or raw material inlet with inert gas.

14 Claims, 4 Drawing Sheets

METHOD AND SYSTEM FOR INERTING POLYMERIC FILM PRODUCING MACHINES

FIELD OF THE INVENTION

Figure 1:
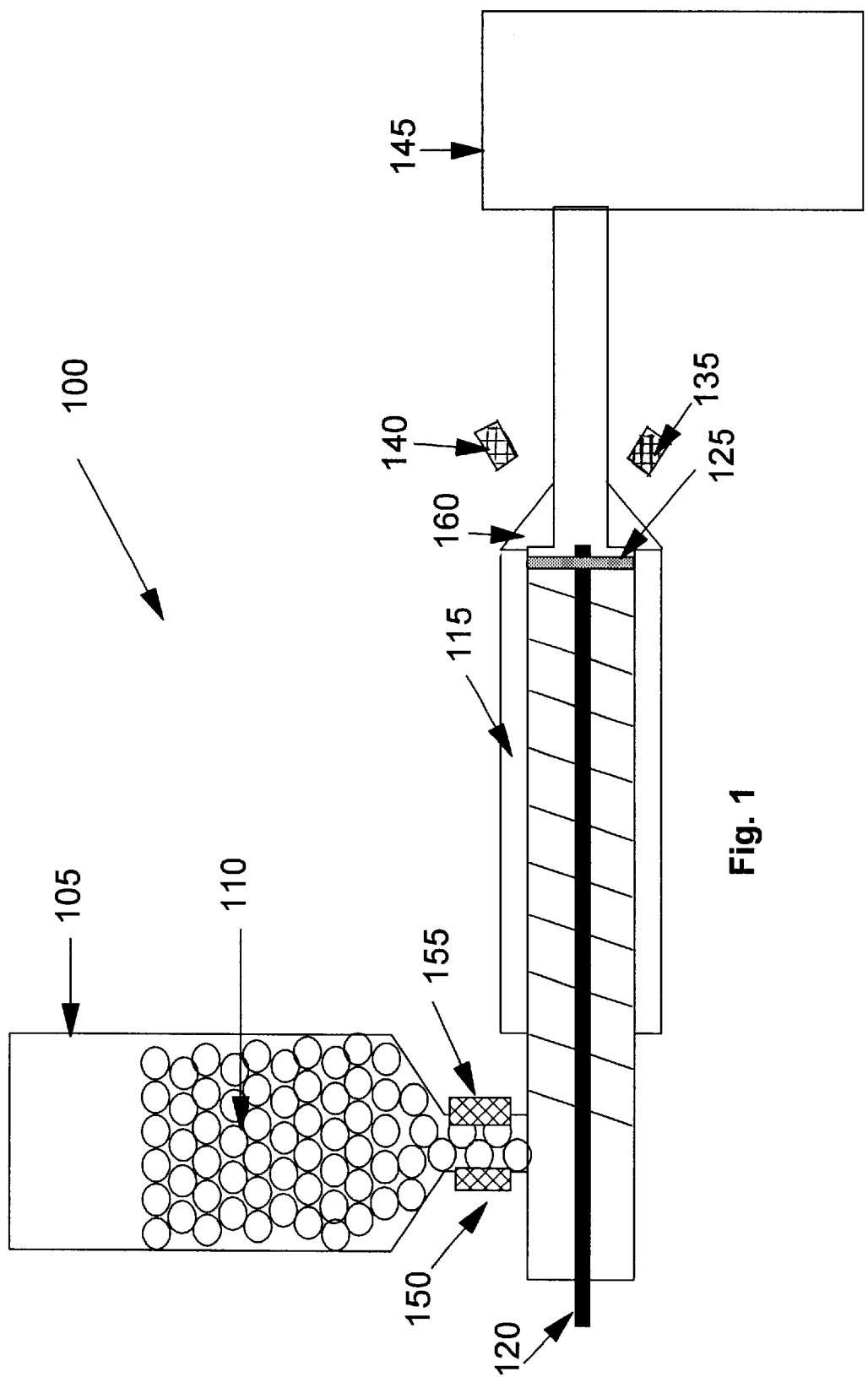

This invention is generally related to a method and system for producing polymeric film. More specifically, this invention is related to a method and system for providing an inerting atmosphere in a selected area of open spaces to produce polymeric film by extrusion.

BACKGROUND OF THE INVENTION

Polymeric films, like polyethylene and polypropylene film, are produced by extrusion. Each of such film products may contain a plurality of layers, typically three or more layers, of film.

In the art, the equipment used for producing the polymeric films consists of as many feeding lines as there are layers in the film. Each feeding line has a mixing and holding hopper in which the components of the master batch, including chemical, such as polymers, colorants and other additions, are mixed prior to directing the film to an electrically heated cylindrical container with a transportation screw. During the transfer of the chemicals, heat is applied to raise the temperature suited for molding the polymeric film. The friction of the product in the extruder generates the pressure needed to push the product through the extrusion die. Before leaving the extruder, the polymeric film product passes a filter to separate the coarse and unwanted materials. In the extrusion die, the product passes through various channels to obtain an equal distribution of the product over the complete length of the die.

When leaving the die, the polymeric film is cooled in order to crystallize the polymer, and to make it more difficult to damage when handling. In case of a linear die, the cooling can be done by blowing air on the film, and by passing the film over a water-cooled cylinder. Once the film is cooled, it is cut at a desired width and then coiled. In case of a circular die, the film is cooled by air blown outside through an annular distribution system, and inside the film via blow extrusion.

Once the product is heated, physical (e.g., thermal decomposition) and chemical (e.g., oxidation and carbonization) phenomenon can create hard, black particles which either remain on the filter in the extruder or deposit on the outlet of the die. In both cases, the production process has to be stopped because, in the event the filter is clogged, the product no longer enters the extrusion die at the desired flow or (in case of deposits on the die exit) the produced film is damaged (e.g., unequal thickness) by the deposits. At a minimum, the deposit adheres to the die outlet, and causes detrimental and undesired effects on the quality of the film, including the formation of scratches, uneven thickness of the film, and decreased deformation of the film. During the shutdown, the extrusion installation has to be cleaned. The entire operation results in a loss of product and productivity. With the frequent shutdowns of the equipment, it may also result in further difficulties for producing larger coils of films.

Various pieces of prior art have unsuccessfully attempted to solve the problems of producing polymeric films. The problem of particle buildup in the die of the extruders has been recognized. Various techniques such as die design changes and chemical additives has been proposed and applied commercially. A review of the studies and solutions related to the subject is provided. See, J. D. Gander et al., "Review of Die Lip Buildup in Plastic Extrusion", Polymer Engineering and Science, July 1997, Vol. 37, No. 7, pp. 1113–1126. The use of inert gas for complex machining at the level of spinner extruders in the production of polymer fibers unrelated to linear has been described in U.S. Pat. Nos. 3,847,522 and 2,252,689. The use of chemical solvents to clean the die lip was described in U.S. Pat. No. 5,391,071.

Further, more complex methods requiring heat to raise the temperature of nitrogen prior to the application of inert gas for installing in the extruder is found in U.S. Pat. No. 3,847,522.

It is, therefore, an object of this invention to provide for a method and system for producing polymeric film in which the extrusion die is not susceptible to damage or formation of undesired oxidized product which interferes with the polymer film extrusion process.

It is an object of this invention to provide for a method and system for inerting an atmosphere in selected area of open spaces during the production of polymeric film by extrusion.

SUMMARY OF THE INVENTION

One aspect of this invention is directed to a method for producing polymeric film in a film making apparatus. Inert gas in the form of an inerting atmosphere is provided to the hopper inlet and/or an extruder outlet. Raw polymers (as part of the master batch) are passed into the hopper inlet. A polymer film product is then recovered from the extruder outlet.

DETAILED DESCRIPTION OF THE DRAWINGS

Figure 2:
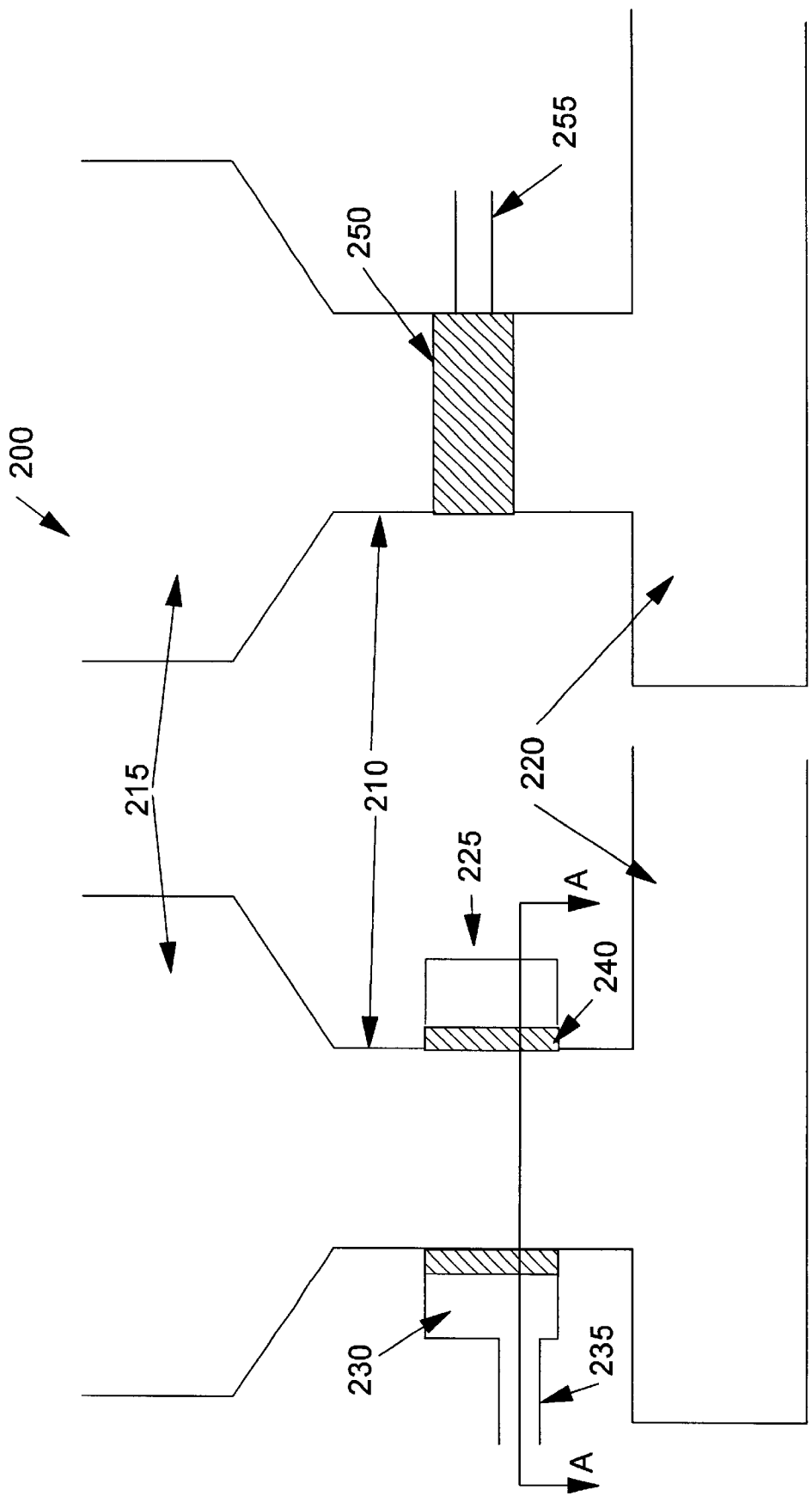
Figure 3:
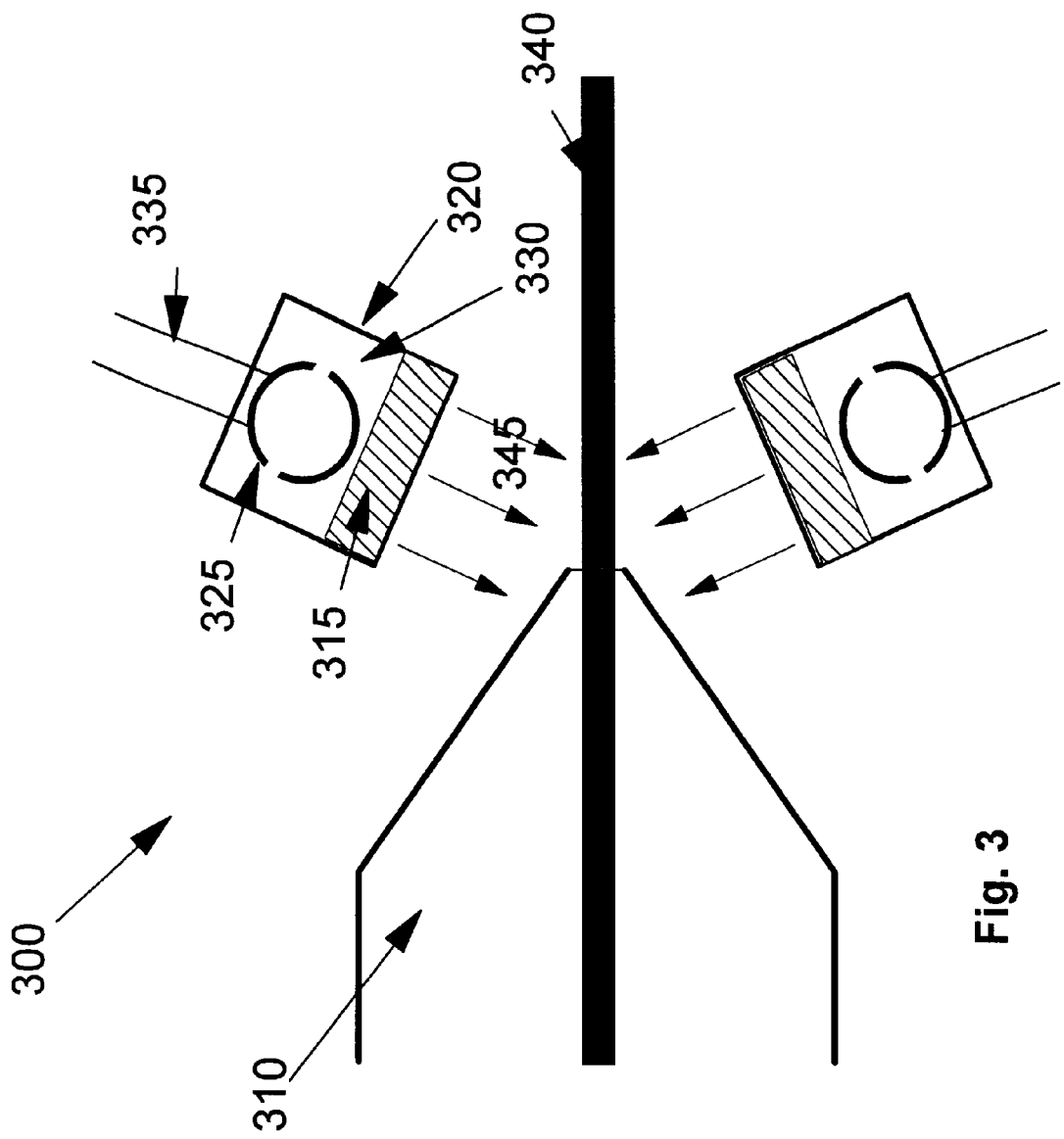
Figure 4:
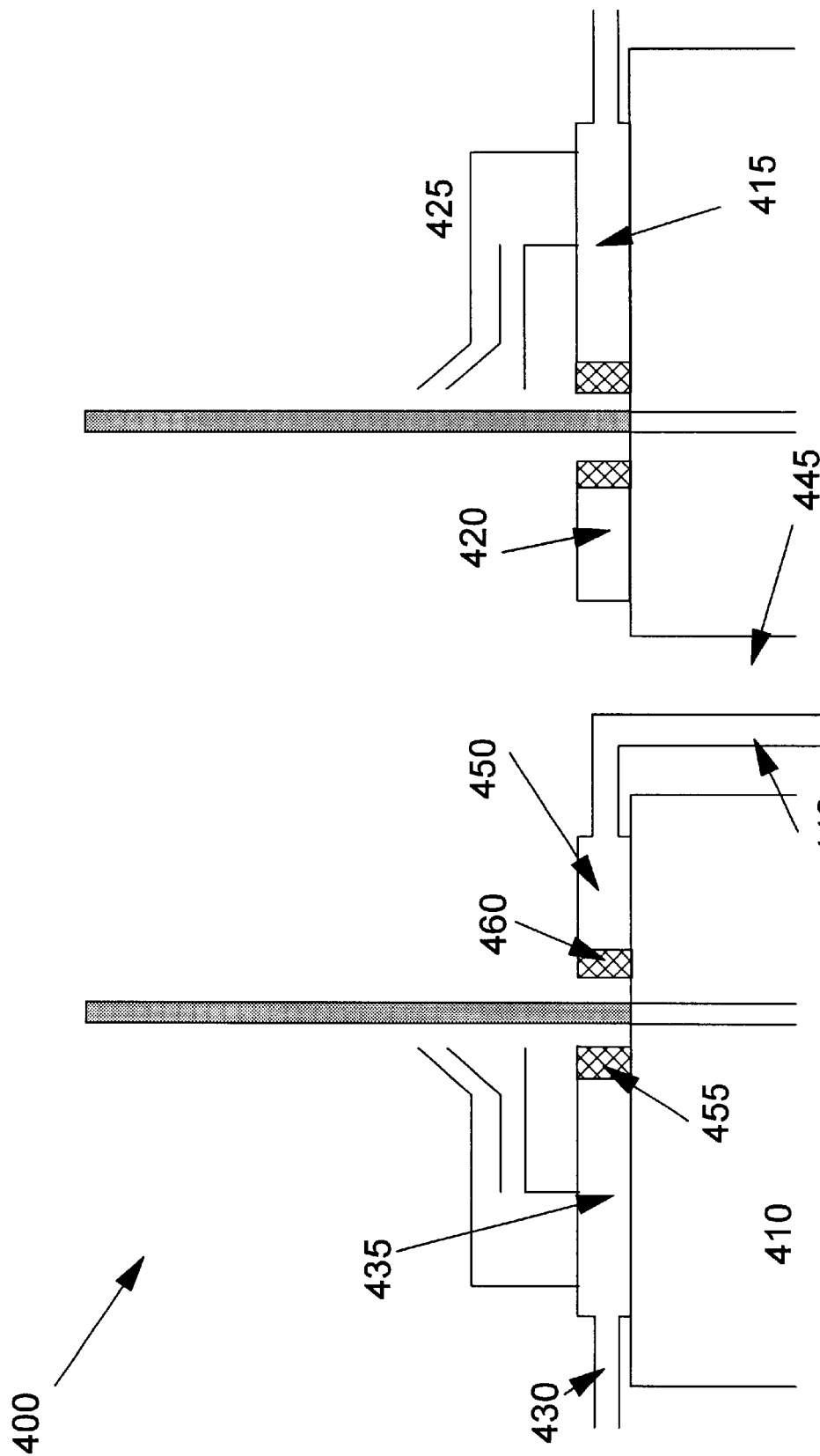

Other objects, features and advantages will occur to those skilled in the art from the following description of preferred embodiments and the accompanying drawings, in which:

FIG. 1 is a side elevation view of the equipment in this invention for producing the polymeric film;

FIGS. 2a and 2b side two dimensional elevation views of the distribution system with a circular shape in the present invention;

FIG. 3 is a side elevation view of the gas distribution system of the present invention as installed at the exit of the laminar extrusion die; and FIG. 4 is a schematic of the external and internal inerting of a film-blowing machine.

DETAILED DESCRIPTION OF THE INVENTION

The following invention solves the problem of oxidation, carbonization and the formation of deposits resulting from the polymer film producing machines. This is done by replacing air, which contains water and oxygen instrumental for causing oxidation, with an inert gas such as nitrogen. This invention does not require changing batch composition of the product, and can easily be installed on the extrusion machines. The invention uses the laminar barrier inerting technology to obtain an inert atmosphere in a specified area of open spaces. See, U.S. Pat. No. 4,823,680 to Nowotarski, which is incorporated herein by reference.

The hopper continuously feeds the polymer grains that lead to the extruder. Between the individual polymer grains, air is trapped, which when heated in the extruder, will partially oxidize the batch resulting in darkened and hard oxidized products which clogs the filter of the extruder. The present invention provides for installing an inert gas distribution system at the outlet of the film extruder to direct the inert gas to the exit of the extruder. The particular way in which the inert gas is injected into the extruder allows the polymer grains to pass, in absence of air, through the extruder. Also, the present invention provides for installing an inert gas distribution system in the pipe between the hopper and the extruder through which the inert gas is equally distributed over the complete diameter of the pipe surface area.

Polymeric films, like polyethylene and polypropylene films are produced by extrusion. Generally, the film may contain up to three or more different layers of film.

The equipment for producing the film is provided by FIG. 1. This equipment 100 may consists of as many feeding lines as there are layers in the film. Each feeding line has a mixing and holding hopper 105 in which the master batch 110, which contains different chemicals, such as polymers and additions like colorants, are mixed to obtain the composition desired for the individual layer and an extruder. The extruder consists of an electrically heated cylindrical container 115 with a transportation screw 120. During the transfer of the product, the extruder is heated to the temperature suited for molding. The friction of the products in the extruder generates the pressure needed to push the product through the extrusion die. Before leaving the extruder, the product passes filter 125 to separate all the coarse and unwanted material. In the extrusion die, the product can be directed through channels to obtain an equal distribution of the product over the complete length of the die. The amount of inert gas provided to the extruder exit area, particularly at or near the extrusion die, is sufficient to replace the oxygen and water in the area. Generally, the inert gas may comprise any inert gas, preferably nitrogen or argon. More preferably, the inert gas is provided from membrane nitrogen.

Once the product is heated, physical (e.g., thermal decomposition) and chemical (e.g., oxidation and carbonization) reactions can create certain hard black particles which either remain on the filter in the extruder or deposit on the outlet of the die. The production of these oxidized and carbonized materials is undesirable because, for example, it may clog the filters. Clogging the filter prevents the product from entering the extrusion die at the desired flow, or in case of the deposit on the die exit, the produced film is damaged (e.g., unequal thickness) by the deposits. At a minimum, the particles adhere to the die outlet, and cause detrimental and undesired effects on the quality of the film including the formation of scratches, uneven thickness of the film, and decreased deformation of the film. Usually, the production process must be shut down. During the shutdown, the extrusion installation has to be cleaned. This entire operation results in a loss of product and productivity. The plant shutdown as a result of may cause various economic detriments to the production process.

This invention provides a solution to the problem created when undesired by-products from carbonization and/or oxidation form and remain on the filter of the extruder or deposit on the outlet of the die. As shown in FIG. 1, an inerting laminar barrier layer may be applied by inerting atmosphere units 135 and 140 at or near the filter of the extruder and/or at the outlet of the die prior to cooling in water tower 145. FIG. 1 provides for the provision of an inerting atmosphere through the inerting atmosphere units 135 and 140 at or near die 160, which is on the outside of filter 125 near the exit of the extruder. Preferably, the inert gas is provided by an even flow of gas through the distribution system into the area to be inerted.

Another approach to direct the inerting gas into the film producing process is to provide an inerting atmosphere in the hopper inlet area (generally through an inert gas distribution system in the pipe between the hopper and the extruder) through atmosphere inerting units 150 and 155. This approach is further described below.

Inerting the extruder

The hopper continuously feeds the extruder. Air is trapped between the individual polymer grains, which will partially oxidize the batch resulting in the black and hard oxidized products which clog the filter. The invention consists of installing an inert gas distribution system in the pipe between the hopper and the extruder (FIGS. 2a and 2b), through which the inert gas is equally distributed over the complete diameter of the pipe. The particular way of injecting the inert gas allows the polymer grains to pass without air passing to the extruder. The inert gas distribution system is made from a metallic sintered plate or tube with a controlled porosity. The high pressure drop over the porous material gives an equal distribution of the inert gas. The exit velocity of the inert gas is sufficiently low to avoid turbulence in the conduit 210. Practical ways of installing the inert gas distribution system are described in the FIGS. 2a and 2b. FIG. 2a shows a distribution system with a circular shape. The conduit 210 between the hopper 215 and the extruder screw 220 is partially replaced by the distribution system 225. The connection between the conduit 210 and the distribution system 225 is made in such a way that no air can enter in or escape from the conduit. As a result, regular techniques like welding are used. The distribution system 225 consists of a distribution ring 230 in which the inert gas is fed through the pipe 235 to the distribution ring 230 to enable the gas to flow freely. The inert gas leaves the distribution ring 230 through the cylindrical porous plate 240 to enter the conduit 210.

A second way of installing the distribution system as it is represented in FIG. 2b is to install a porous tube 250, and which is inserted in the conduit 210. The porous tube 250 is directly connected to the inert gas feeding system by through pipe 255. The latter is a simple way of installing the distribution system.

Inerting the linear extrusion die exit

A similar inert gas distribution system as described above is installed at the exit of the laminar extrusion die (FIG. 3). The distribution system covers the complete length of the extrusion die 310 and produces an equal flow of inert gas all over the die exit, creating an inert atmosphere in that particular area and reducing the oxidation and carbonization of the product during the film production process. The distribution system can be made by a flat porous plate 315 welded on a U shape steel profile 320. In order to assure good even distribution of the nitrogen over the complete length of the die, an internal inert gas distribution system 320 is installed in plenum 330 created between U shape steel profile 320 and porous plate 315, which can consist of a pipe with holes drilled on fixed distances. The internal distribution system 325 is connected to the inert gas feeding system through pipe 335. Optimum inerting is obtained by installing two such distribution systems, one at each side of plastic film 340, and have them both directed in such a way that nitrogen flow 345 hits the film at the die exit. The complete system allows the equal distribution of inert gas at a distance of over 3 meter length. If needed, the system can be extended to cover still longer dies. Another way of bringing the inert gas to the die is to make use of a porous tube of which the surface is partially covered, for example, e.g., by means of half a tube. Whatever system is used, the distribution system has to be installed within 20 mm distance from the die exit, and the inerting gas provided at a distance of less than 20 mm to the area where the inert gas is directed. Generally, the flow of the inert gas ranges from aboout 5 to 15 m$^3$/h per meter, preferably from about 8 to 12 m$^3$/h per meter.

Inerting film blowing machines

As mentioned above, film blowing machines have an annular distribution system to blow cooling air on the produced film. The inert gas distribution system is installed between the die exit and the air distribution system. Because of the construction of the extrusion machine, the inert gas distribution system is of an annular form. As in the previous descriptions, the system uses a sintered porous plate to obtain a good distribution of the inert gas, which first passes the plenum. The plenum is supplied by one or more passages. FIG. 4 shows the external and internal inerting of such a film blowing machine. The inert gas distribution systems 415 and 420 are placed on top of the extrusion head 410, which is partially shown. The inert gas is distributed in the plenum 435 and leaves, equally distributed, through porous plate 455. The distribution system 415 serves to inert the outer part of the film and is placed between the extrusion head 410 and the air nozzle 425. The system consists of the connection pipe with inert gas supply source 430, circular plenum 435 and the porous plate. The distribution system 420 distributes the gas at uniform pressure to inert the film at the extruder exit from the inside. The system consists of the connection with inert gas supply system 440. The connection is placed inside the extrusion head, through the existing air channel 445. The inert gas is then distributed in the plenum 450 and leaves, equally distributed, through the porous plate 460.

EXAMPLES

Example 1

A 250 kg/h feeding hopper is connected to the extruder by a 50 mm diameter pipe. A tubular distribution system was installed in the pipe and through this 5 nm$^3$/h nitrogen was injected. This resulted in an oxygen content of less than 1 volume percent between the injection point and the extruder. As a result, the production process reduces and causes shut downs due to clogged filters at the end of the extruder depend on the type of batch. When working with batches which are sensitive to oxidation (e.g., because they contain a large amount of fines), it has been seen that the number of production stops could be reduced from three to one.

Example 2 i) A die with a length of 3 m was inerted using 30 nm$^3$/h of nitrogen, which created an atmosphere with an oxygen content of less than 1 volume percent between the inerting system and the die exit. The production stoppages due to deposits on the die exit were reduced from three (3) per day to one (1) per day.

ii) A 90 cm long die was equipped on both sides with an nitrogen distribution system. A total flow of 20 nm$^3$/h of nitrogen created a low oxygen containing atmosphere at the die exit resulting the production stoppages from twelve (12) per day to one per day.

The use of inerting gas to apply an inerting atmosphere at a selected area of open spaces of this invention is also applicable to other aspects of the polymeric film producing machine, such as the polymeric filament and flow molding machine.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A method for producing polymeric film in a film making apparatus having an inert gas distribution system on top of an extrusion head between a hopper inlet and an extruder outlet, said method comprising
   a. providing a portion of inert gas through a laminar barrier into an area covering said extruder outlet;
   b. passing raw polymers into said hopper inlet; and
   c. recovering a polymer film product from said extruder outlet.

2. The method of claim 1 wherein said method comprises providing said portion of inert gas at an extrusion die.

3. The method according to claim 1 wherein the method comprises providing a portion of inert gas sufficient to replace the oxygen and water content to said area covering said extruder outlet through a distribution system.

4. The method of claim 1 wherein said providing a portion of inert gas comprises passing inert gas through a distribution system at a distance less than about 20 mm from a die exit in the extruder outlet.

5. The method of claim 1 wherein said feeding of said distribution system comprises passing gas through a distribution ring and a porous plate.

6. The method of claim 1 wherein said inert gas is selected from the group consisting of argon and nitrogen.

7. The method of claim 6 wherein said inert gas comprises membrane nitrogen.

8. The method of claim 6 wherein the flow of said inert gas is from about 8 to 12 m$^3$/h per meter of extruder outlet area.

9. The method of claim 1 further comprising providing a portion of inert gas into said hopper inlet area sufficient to replace the oxygen and water content to said area covering said hopper inlet through a distribution system.

10. A method for producing polymeric film in a film making apparatus having an inert gas distribution system between a hopper inlet and an extruder outlet and a conduit between the hopper inlet and the extruder outlet, said method comprising
    a. providing a portion of inert gas into an area covering said hopper inlet;
    b. passing raw polymers into said hopper inlet; and
    c. recovering a polymer film product from said extruder outlet, wherein the exit velocity of said inert aas is sufficiently low to avoid turbulence in the conduit.

11. The method of claim 10 wherein said providing a portion of inert gas comprises feeding an amount of inert gas sufficient to replace the oxygen and water content to said area covering said hopper inlet through a distribution system.

12. The method of claim 10 wherein said inert gas is selected from the group consisting of argon and nitrogen.

13. The method of claim 12 wherein said inert gas comprises membrane nitrogen.

14. The method of claim 12 wherein the flow of said inert gas is from about 8 to 12 m$^3$/h per meter of extruder outlet area.

* * * * *